(12) United States Patent
Sherlock

(10) Patent No.: US 11,909,643 B2
(45) Date of Patent: Feb. 20, 2024

(54) EFFICIENT PROGRESSION MANAGEMENT IN A TRACKER WITH MULTIPLE SOURCES

(71) Applicant: Hewlett Packard Enterprise Development LP, Houston, TX (US)

(72) Inventor: Derek Alan Sherlock, Ft Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 222 days.

(21) Appl. No.: 17/473,643

(22) Filed: Sep. 13, 2021

(65) Prior Publication Data

US 2023/0079278 A1    Mar. 16, 2023

(51) Int. Cl.
 H04L 47/12       (2022.01)
 H04L 43/0876     (2022.01)
 H04L 43/16       (2022.01)

(52) U.S. Cl.
 CPC .......... H04L 47/12 (2013.01); H04L 43/0876 (2013.01); H04L 43/16 (2013.01)

(58) Field of Classification Search
 CPC ...... H04L 47/12; H04L 43/0876; H04L 43/16
 See application file for complete search history.

(56) References Cited

U.S. PATENT DOCUMENTS

| | | | |
|---|---|---|---|
| 6,523,076 B1 | 2/2003 | Kruse | |
| 6,681,226 B2 | 1/2004 | Bretl et al. | |
| 6,813,245 B1* | 11/2004 | Furuno | H04L 12/5601 370/252 |
| 7,082,480 B2 | 7/2006 | Bogin et al. | |
| 7,500,035 B2 | 3/2009 | Johns et al. | |
| 8,171,448 B2 | 5/2012 | Johns et al. | |
| 8,458,451 B2 | 6/2013 | Shasha et al. | |
| 9,817,670 B2 | 11/2017 | Gupta et al. | |
| 10,338,974 B2 | 7/2019 | Fahim et al. | |
| 2012/0159084 A1 | 6/2012 | Pohlack et al. | |
| 2012/0209650 A1* | 8/2012 | Romagnino | G06Q 10/06 705/7.15 |
| 2013/0332910 A1 | 12/2013 | Ganai | |
| 2021/0021545 A1* | 1/2021 | Srivastava | H04L 49/9089 |
| 2022/0210075 A1* | 6/2022 | Musleh | H04L 47/127 |

* cited by examiner

*Primary Examiner* — Donald L Mills
(74) *Attorney, Agent, or Firm* — Yao Legal Services, Inc.

(57) ABSTRACT

A system for facilitating efficient progression management in a multi-source tracker of a responder device is provided. During operation, the system can maintain, in a memory device of the responder device, a first tracker for all requests and a second tracker for a privileged group of requests. The system can select a first group from a set of groups as the privileged group. If a request from a requesting device cannot be accepted into the first tracker, the system can determine whether the request belongs to the first group based on a header field of the request. If the request belongs to the first group, the system can select the request for accepting into the second tracker. Subsequently, when a respective request belonging to the first group has been accepted, the system can select a second group from the set of groups as the privileged group.

20 Claims, 10 Drawing Sheets

EFFICIENT PROGRESSION MANAGEMENT IN A TRACKER WITH MULTIPLE SOURCES

BACKGROUND

Field

The present disclosure relates to communication networks. More specifically, the present disclosure relates to a method and system for progression management in a tracker that may receive requests from a plurality of sources.

BRIEF DESCRIPTION OF THE FIGURES

In the figures, like reference numerals refer to the same figure elements.

DETAILED DESCRIPTION

Figure 1A:
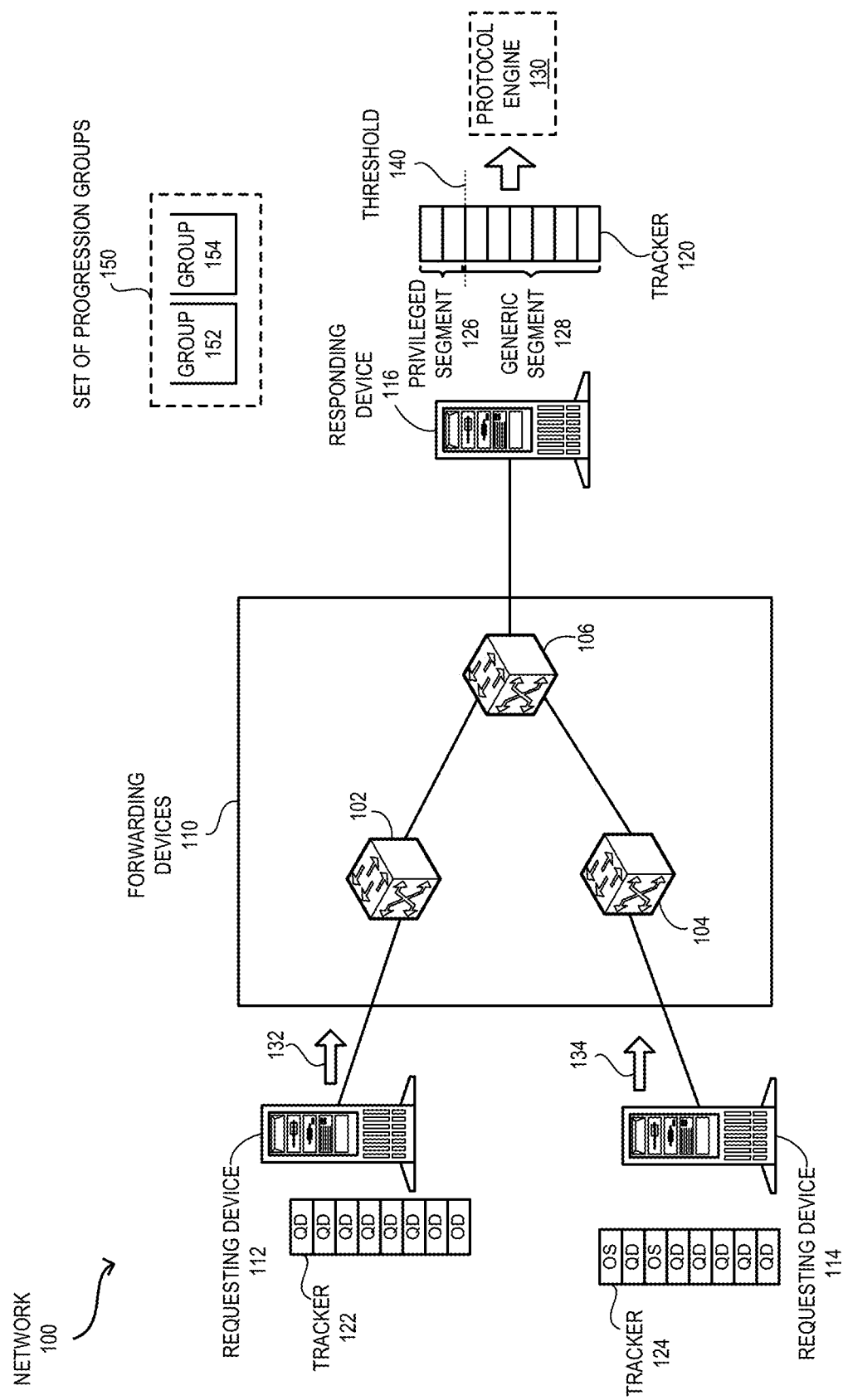
FIG. 1A illustrates an example of a network supporting efficient progression management for multi-source trackers, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

High-capacity interconnects are the delivery medium for a variety of applications running on physical and virtual devices. Such applications have brought with them an increasing demand for bandwidth. As a result, equipment vendors race to build larger devices with significant processing capabilities. Consequently, a distributed system may include different types of devices, such as a requesting device that issues a request (e.g., for a transaction on a piece of data) and a responder device that processes the request (e.g., performs the transaction). Typically, a requesting or responder device can be an endpoint, such host or a user device. A responder device can receive requests from a plurality of requesting devices. The responder device can accept the requests and store in the buffer.

However, if the buffer is full, the responder device may not be able to receive subsequent requests. When multiple requesting devices contest for transaction resources at the responding device, requests from a requesting device may over-utilize the buffer while requests from another requesting device may continue to be denied acceptance. Without progression management for the buffer, such a contest can result in resource starvation, livelock, or other adverse conditions. Under such circumstances, a lack of forward progression may occur at the responder device, and some requesting devices may not issue a request accepted at the responding node.

One aspect of the present technology can provide a system for facilitating efficient progression management in a multi-source tracker of a responder device. A tracker can be a buffer capable of tracking requests in progress. During operation, the system can maintain, in a storage device of the responder device, a first tracker for all requests and a second tracker for a privileged group of requests. The system can select a first group from a set of groups as the privileged group. If a request from a requesting device cannot be accepted into the first tracker, the system can determine whether the request belongs to the first group based on a header field of the request. If the request belongs to the first group, the system can select the request for accepting into the second tracker and performing a set of operations indicated in the request. Subsequently, when a respective request belonging to the first group has been accepted, the system can select a second group from the set of groups as the privileged group.

In a variation on this aspect, the first and second trackers can be segments of an ingress tracker at the responding device.

In a further variation, the system can maintain a threshold for the ingress tracker and determine whether utilization of the ingress tracker has reached the threshold. The second tracker can be a segment of the ingress tracker beyond the threshold.

In a variation on this aspect, the system can select the request for accepting into the second tracker by determining that the second tracker can accommodate the request and accepting the request into the second tracker.

In a variation on this aspect, the system can determine whether the first tracker can accommodate a second request from the requesting device. The second request may not be associated with the set of groups. The system can then allocate a non-privileged group from the set of groups to the second request.

In a further variation, the system can send a negative acknowledgment (NACK) comprising an identifier of the allocated non-privileged group to the requesting device.

In a variation on this aspect, the system can maintain a corresponding counter for a respective group of the set of groups. The counter can indicate the number of requests allocated to the group.

In a further variation, the system can increment the counter if a request is allocated to the group. On the other hand, the system can decrement the counter if a request belonging to the group is accepted.

In a variation on this aspect, the system can accept a third request from the requesting device regardless of the third request's association with the set of groups if the third request can be accommodated in the first tracker.

The examples described herein solve the problem of facilitating progression to requests in a tracker from multiple sources by (i) allocating a progression group from a set of progression groups to a respective unaccepted request, (ii) delegating one of the groups as the privileged group and accepting requests belonging to the privileged group in a dedicated tracker at a responding device, and (iii) selecting another group the privileged group based on a swapping criterion. In this way, a respective request from a respective source (e.g., a requesting device or a tracker in the requesting device) is eventually allocated to a privileged group and accepted for processing at the responding device. A tracker can be a buffer capable of tracking requests in progress.

With existing technology, the network coupling a requesting device to a responding device can facilitate the transfer of requests and responses. Consequently, a respective request issued by a requesting device can be carried by the network. The responding device can receive the request and determine whether the request can be accepted based on availability of space in an ingress tracker of the responding device. If the responding device cannot accept a request due to over-utilization of the tracker, the responding device can reject the request and issue a response indicating that the request should be retried (e.g., a negative acknowledgment (NACK)). Hence, a NACK can also be referred to as a "retry" response. One of the requesting devices may send a number of requests that can occupy the ingress tracker at the responding device.

Even though the network can be a lossless network (i.e., without packet losses for the requests), the responding device may not accommodate requests from other requesting devices. Consequently, the lack of forward progression at the ingress tracker may lead to resource starvation, livelock, or other adverse conditions for some requesting devices. Issuing a request or a NACK includes including the request or NACK in a packet, setting the source and destination addresses of the header of the packet, determining an egress port, and sending the packet via the egress port.

To solve this problem, the responding device can maintain a set of progression groups. The groups can be identified by corresponding group identifiers or group numbers (e.g., non-negative integers). For example, if the responding device maintains two groups, the responding device may identify the groups with "0" and "1." The responding device can select one of the groups as the privileged group. The responding device can maintain a dedicated tracker for storing requests belonging to the privileged group. The dedicated tracker can be a segment beyond a threshold of the ingress tracker. This portion of the tracker can be reserved for requests belonging to the privileged group and can be referred to as the privileged segment of the tracker. The rest of the tracker (i.e., the portion below the threshold) can accommodate any request of any group and can be referred to as the generic segment of the tracker.

A requesting device may issue a request, store the request in an egress tracker, and send the request to the responding device via a network. Upon receiving the request, the responding device can determine whether the request can be accepted at the responding device. The responding device may use an ingress tracker, which tracks a respective incoming request for accepted requests. In other words, the tracker can be a buffer in which the responding device can track the progress of a respective request. Consequently, the tracker may support out-of-order completion of a request. If the tracker has room for the request, the responding device can accept the request and place the request in the tracker.

However, if the tracker cannot accommodate the request, the responding device can allocate a non-privileged group to the request and send a NACK comprising the group identifier (or a group number) to the requesting device. The responding device can maintain a counter for a respective group. The counter can indicate the number of outstanding requests for that group. Since the responding device has issued a NACK, the counter associated with the group is incremented. Upon receiving the NACK, the requesting device can determine that the request remains outstanding and store the group identifier for the request. In this way, the requests can become grouped. For a respective subsequent retransmission of the grouped request, the requesting device can send the group identifier with the request (e.g., in a field of the header of the request).

Upon receiving the request with a group identifier, the responding device can determine whether the group identifier corresponds to the privileged group. If the generic segment can accommodate a request, the responding device can accept the request regardless of its group identifier. On the other hand, if the generic segment cannot accommodate a new request and the request belongs to the privileged group, the responding device can determine whether the privileged segment can accommodate the request. If the request can be accommodated, the responding device can accept the request and store the request in the privileged segment. The responding device can then decrement the counter associated with the group.

When the number of requests associated with a group reaches a swapping criterion, the responding device can swap the privileged status and determine another group as the privileged group. The swapping criterion can indicate that no request belonging to the privileged group remains outstanding. The responding device can then determine when to select a new privileged group based on the counter reaching a value of zero. Since a respective group allocated to a request eventually becomes the privileged group, the request can have the opportunity to be accepted at the responding device. In this way, the responding device can facilitate eventual progression of the requests directed to the tracker.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

The term "requesting device" refers to a device that initiates a request (e.g., associated with a transaction) directed to another device. "Requesting device" can be replaced by other terminologies referring to a request initiating device, such as "requester," "initiator," and "request source." Furthermore, the term "responding device" can refer to a device that responds to the request. "Responding device" can be replaced by other terminologies referring to a request responding device, such as "responder" and "request destination." A phrase indicating a computing device, such as "node," "machine," "entity," or "device" may follow the aforementioned replacement phrases.

FIG. 1A illustrates an example of a network supporting efficient progression management for multi-source trackers, in accordance with an aspect of the present application. A network 100 may comprise a number of forwarding devices 110, which can include switches 102, 104, and 106. Network 100 can also include endpoint devices (or host devices) 112, 114, and 116 coupled to switches 102, 104, and 106, respectively. In some examples, network 100 can facilitate high-capacity lossless communication among the switches of network 100. Under such a scenario, communication among the switches in network 100 is based on distributed memory. In some other examples, network 100 can be an Ethernet, InfiniBand, or other networks, and may use a corresponding communication protocol, such as Internet Protocol (IP), memory-semantic communications, Fibre-Channel over Ethernet (FCoE), or other protocol.

Typically, devices 112 and 114 can be requesting (or sender) devices issuing requests and injecting corresponding packets into network 100. Responding (or receiver) device 116 can include a tracker 120 for storing requests issued from a respective requesting device. Tracker 120 can also be referred to as a tracker since it can track the requests. Tracker 120 can be an individual tracker or a combination of trackers that can hold requests from a requesting device. Accordingly, responding device 116 can store a request 132 from requesting device 112 in tracker 120. Responding device 116 may process the requests from tracker 120. Tracker 120 can be a buffer in which responding device 116 can track the progress of a respective request. Consequently, tracker 120 may support out-of-order completion of a request. With existing technology, requesting devices 112 and 114 can maintain egress trackers 122 and 124, respectively, for maintaining local requests. Such requests can be issued by applications running on requesting devices 112 and 114. A request can be queued (QD) in an egress tracker or remain outstanding (OD) upon issuing. An outstanding request has not been accepted by responder device 116 yet.

A respective request, such as request 132, issued from tracker 122 can be carried by forwarding devices 110. Responding device 116 can receive request 132 and determine whether the request can be accepted based on the availability of space in tracker 120 of responding device 116. If request 132 is accepted, responding device 116 can provide request 132 to protocol engine 130 of responding device 116 for subsequent processing, which can include performing one or more operations indicated in request 132. On the other hand, if responding device 116 cannot accept request 132 due to over-utilization of tracker 120, responding device 116 can reject request 132 and issue a NACK.

Under some circumstances, requesting device 112 may send a number of requests that can occupy tracker 120.

Even though network 100 can be a lossless network, responding device 116 may not accommodate a request 134 from requesting device 114 since tracker 120 may not accommodate request 134. Consequently, the lack of forward progression at tracker 120 may cause a large number of requests at tracker 124 to remain outstanding. As a result, network 100 may incur adverse conditions, such as resource starvation and livelock. Issuing request 134 or a corresponding NACK can include including request 134 or the NACK in a packet, setting the source and destination addresses of the header of the packet, determining an egress port, and sending the packet via the egress port.

To solve this problem, responding device 116 can maintain a set of progression groups 150. Each of the groups can also be referred to as a progression group. The bins can be identified by corresponding group identifiers or group numbers. For example, if responding device 116 maintains two bins 152 and 154, responding device 116 may identify bins 152 and 154 with non-negative integers, such as with "0" and "1," respectively. Responding device 116 can select one of bins 152 and 154 as the privileged group. Responding device 116 can maintain a dedicated tracker for storing requests belonging to the privileged group. The dedicated tracker can be a portion beyond threshold 140 of tracker 120. This portion of tracker 120 can be reserved for requests belonging to the privileged group and can be referred to as privileged segment 126. The rest of tracker 120 (i.e., the portion below threshold 140) can accommodate any request of any group and can be referred to as generic segment 128 of tracker 120.

Suppose that responding device 116 has selected group 152 as the privileged group. If tracker 120 cannot accommodate request 134, responding device 116 can allocate non-privileged group 154 to request 134 and send a NACK comprising the group identifier of group 154 to requesting device 114. Responding device 116 can maintain a counter for each of bins 152 and 154. The counter can indicate the number of outstanding requests for that group. Since responding device 116 has issued a NACK for request 134, the counter associated with group 154 is incremented. Upon receiving the NACK, requesting device 114 can determine that request 134 remains outstanding and store the identifier of group 154 in association with request 134. In this way, request 134 can become grouped. For a respective subsequent retransmission of request 134, requesting device 114 can send the identifier of group 154 with request 134 (e.g., in a field of the header of request 134).

Upon receiving request 134 with the identifier of group 154, responding device 116 can determine whether group 154 is the privileged group. If generic segment 128 can accommodate request 134 (i.e., the utilization of tracker 120 is below threshold 140), responding device 116 can accept request 134 regardless of its group identifier. However, if generic segment 128 cannot accommodate a new request (i.e., the utilization of tracker 120 is at or beyond threshold 140), responding device 116 can determine whether request 134 belongs to the privileged group. Since request 134 belongs to non-privileged group 154, responding device 116 can issue another NACK with the identifier of group 154. Hence, the allocation of a group can remain persistent for a request.

On the other hand, responding device 116 can use privileged segment 126 to accept at least some requests belonging to privileged group 152. For each accepted request, responding device 116 can store the request in privileged segment 126 and decrement the counter associated with group 152. When the number of requests associated with group 152 reaches a swapping criterion based on the decrements, responding device 116 can swap the privileged status and determine group 154 as the privileged group. The swapping criterion can indicate that no request belonging to group 152 remains outstanding. Responding device 116 can then determine when to select group 154 as the privileged group based on the counter of group 152 reaching a value of zero.

Upon receiving the NACK, requesting device 114 can determine that request 134 remains outstanding. Requesting device 114 can then reissue request 134 with the identifier of group 154. Upon receiving request 134, responding device 116 can determine request 134 belongs to privileged group 154. If privileged segment 126 can accommodate request 134, responding device 116 can accept request 134. The swapping among the bins can allow a respective group to eventually become the privileged group. Consequently, a respective request can have the deterministic opportunity to be accepted at responding device 116. In this way, responding device 116 can facilitate progression of the requests from multiple sources directed to tracker 120.

Figure 1B:
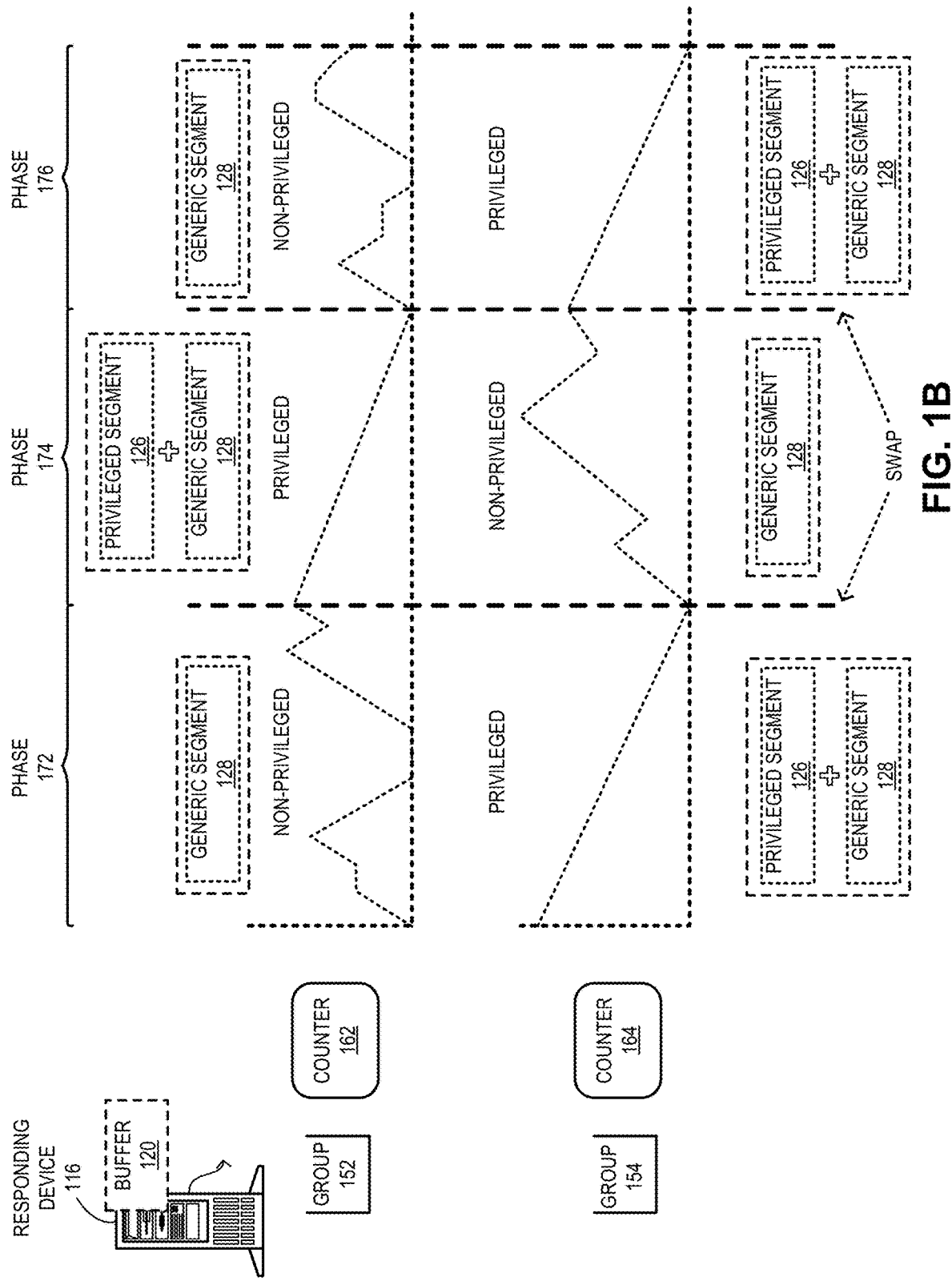
FIG. 1B illustrates an example of progression management using a set of progression groups, in accordance with an aspect of the present application.

FIG. 1B illustrates an example of progression management using a set of progression bins, in accordance with an aspect of the present application. In this example, responding device 116 can maintain the number of requests allocated to bins 152 and 154 using counters 162 and 164, respectively. When responding device 116 allocates a request to group 152, responding device 116 can increment counter 162. On the other hand, when responding device 116 accepts a request belonging to group 152, responding device 116 can decrement counter 162. Since the privileged status of a group is changed, the progression of tracker 120 can be represented as a series of consecutive phases. In each phase, one of the bins is selected as the privileged group. A phase transitions to the next phase when a new privileged group is selected.

Suppose that group 154 is selected as the privileged group during phase 172. Hence, group 154 is not allocated to a new request during phase 172. Requests allocated to group 154 can be accepted into both privileged segment 126 and generic segment 128. As a result, the value of counter 164 may not increase and can steadily decrease over time. On the other hand, requests allocated to group 152 can be accepted only into generic segment 128. As a result, based on the utilization of generic segment 128, the value of counter 162 can vary and may remain zero during some periods. When the value of counter 164 reaches zero, responding device 116 can select group 152 as the privileged group during phase 174. During phase 174, all new requests are allocated to group 154, and group 152 is not allocated to a new request. Requests allocated to group 152 can be accepted into both privileged segment 126 and generic segment 128 during phase 174. As a result, the value of counter 162 may not increase, can steadily decrease over time, and may eventually reach zero.

When the value of counter 162 reaches zero, responding device 116 can again select group 154 as the privileged group during phase 176. During phase 176, all new requests are allocated to group 152, and group 154 is not allocated to a new request. Requests allocated to group 154 can be accepted into both privileged segment 126 and generic segment 128. As a result, the value of counter 164 may not increase, can steadily decrease over time, and may eventually reach zero during phase 174. In this way, during each phase, one of the bins is selected to be the privileged group.

Since all requests of the privileged group are accepted during the phase, the counter associated with the privileged group can decrease during that phase and eventually reaches a value of zero. At that point, a new group can be selected to be the privileged group and a subsequent phase can be initiated. In this way, a respective request from a respective source is eventually accepted by responding device 116, thereby ensuring the progression of requests at tracker 120.

Figure 2:
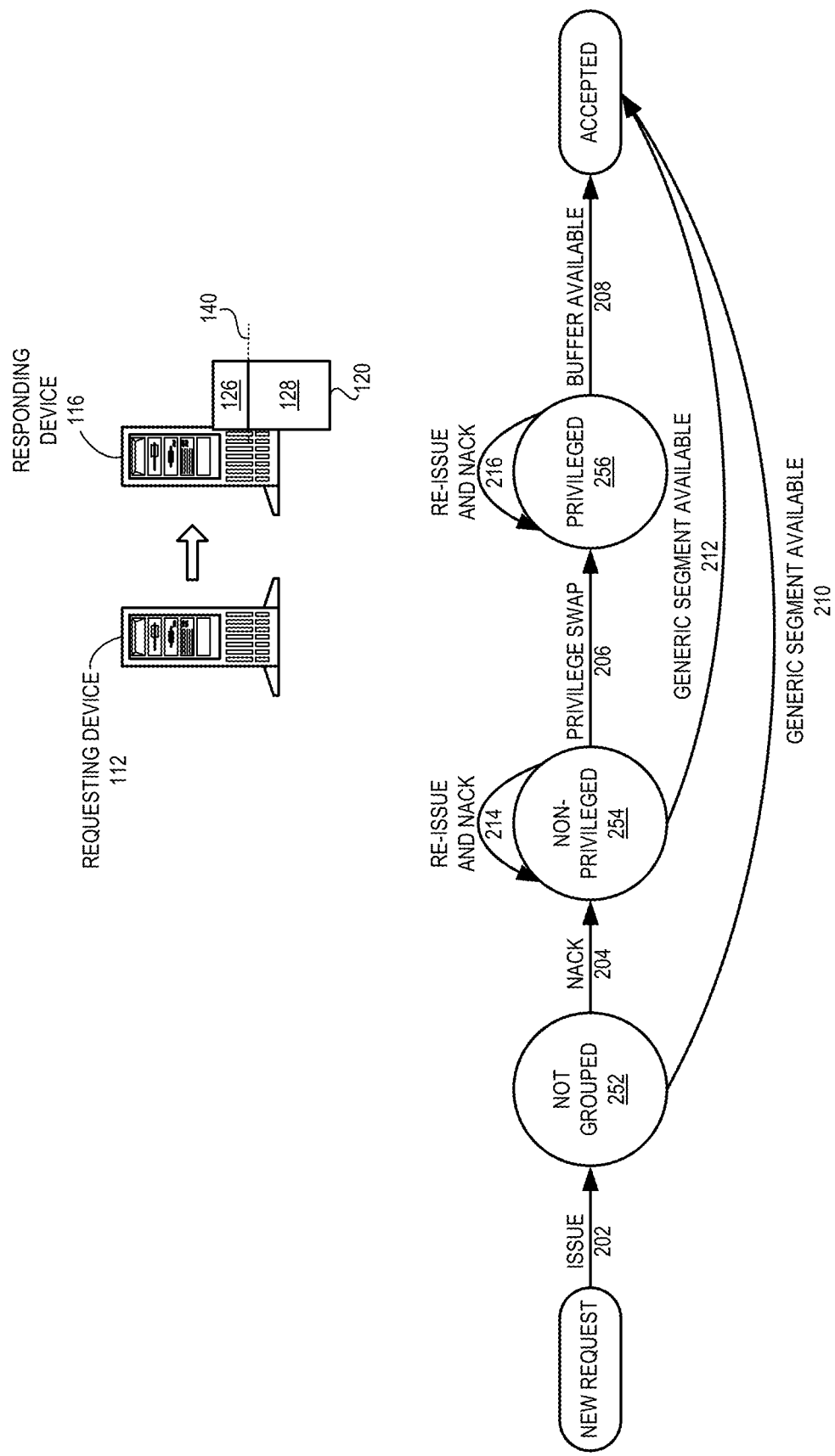
FIG. 2 illustrates the process of progression management using a set of progression groups, in accordance with an aspect of the present application.

FIG. 2 illustrates the process of progression management using a set of progression bins, in accordance with an aspect of the present application. When requesting device 112 issues a new request (operation 202), the request is at a not grouped state 252. If the generic segment of tracker 120 is available (operation 210), the request can be accepted. On the other hand, if responding device 116 cannot accommodate the request in tracker 120, responding device 116 can issue a NACK with a non-privileged group (operation 204). The request can then be at a non-privileged state 254. For each reissuance of the request, if generic segment 128 of tracker 120 is available (operation 212), the request can be accepted. On the other hand, if responding device 116 cannot accommodate the request in generic segment 128 of tracker 120, responding device 116 can reissue a NACK with the same group (operation 214).

When the counter of the privileged group reaches zero, responding device 116 can perform a privilege swap (operation 206). The request can then transitions to a privileged state 256. For each reissuance of the request, if any segment of tracker 120 is available (operation 208), the request can be accepted. For example, when a request belongs to a privileged group, the request can be accepted in both segments 126 and 128. On the other hand, if responding device 116 cannot accommodate the request in tracker 120, responding device 116 can reissue a NACK with the same group (operation 216). Hence, the request can be accepted from not grouped, non-privileged, and privileged (states 252, 254, and 256, respectively). Furthermore, if the request remains outstanding with the initially allocated non-privileged group, the request can transition to the privileged group. The request can remain in the privileged group until all requests belonging to that group are accepted (i.e., the corresponding counter reaches a value of zero). Therefore, the request can be deterministically accepted in tracker 120, which can ensure the efficient progression of tracker 120.

Figure 3:
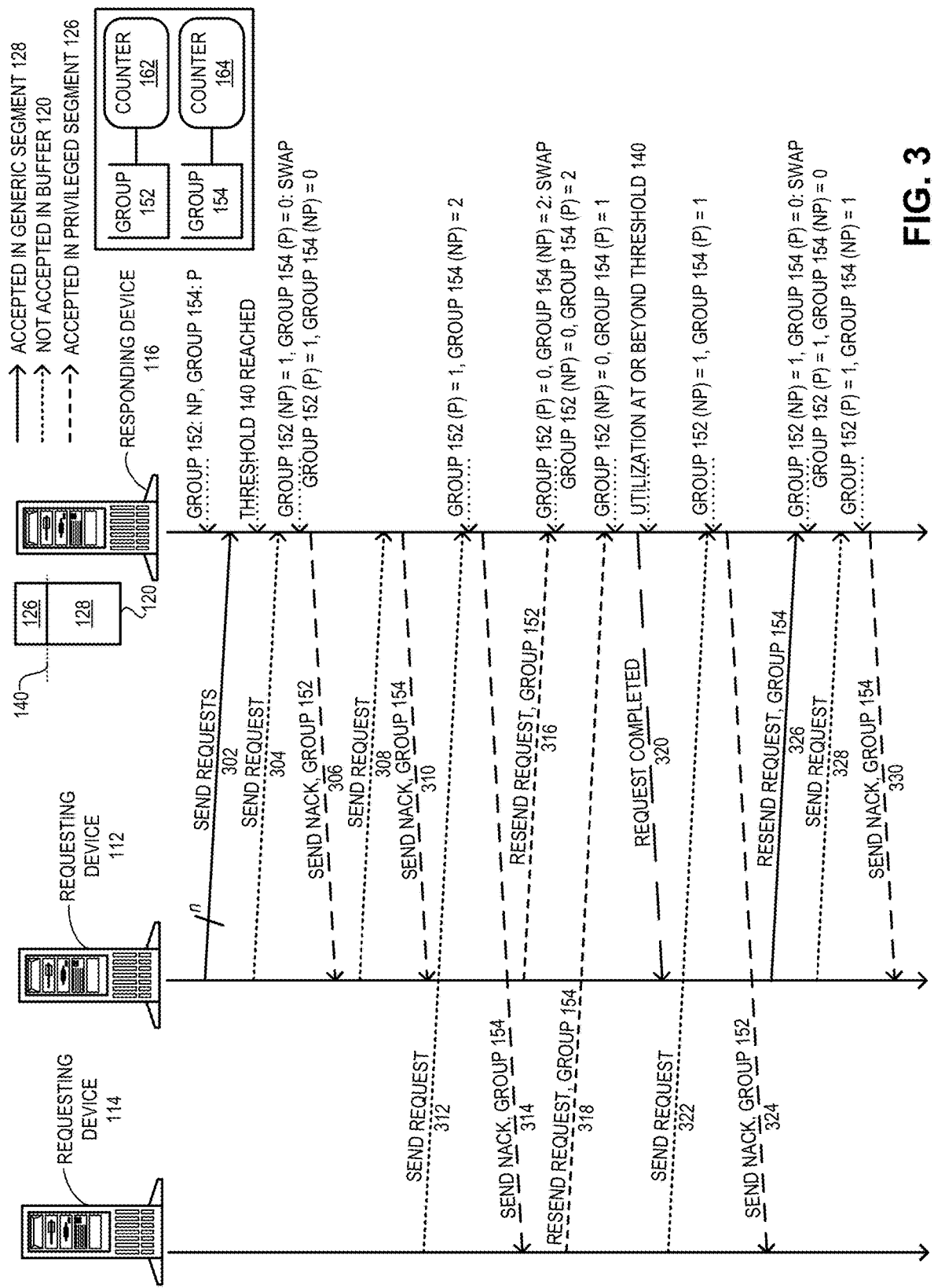
FIG. 3 illustrates communication for facilitating progression management using a set of progression groups, in accordance with an aspect of the present application.

FIG. 3 illustrates communication for facilitating progression management using a set of progression bins, in accordance with an aspect of the present application. During operation, responding device 116 can select group 154 as the privileged group. The initial values of counters 162 and 164 of bins 152 and 154, respectively, can be 0. The responding device 116 can use a selection method, such as random selection or configuration-based selection, to select the privileged group. Requesting device 112 can send a large number of requests (e.g., n requests) to responding device 116 (operation 302). As a result, the utilization of tracker 120 can reach threshold 140 and cause generic section 128 to be occupied. Requesting device 112 can send a subsequent request (operation 304). Responding device 116 can determine that threshold 140 has been reached and the request is unbinned. Responding device 116 can then allocate the request to group 152 and increment counter 162 to 1. Responding device 116 can send a NACK with the identifier of group 152 to requesting device 112 (operation 306).

However, since counter 162 of group 152 has a non-zero value and counter 164 of group 154 has a value of 0, responding device 116 can determine that the swapping criterion has been met. Accordingly, responding device 116 can select group 154 as the privileged group. When requesting device 112 sends another request (operation 308), responding device 116 can allocate the request to group 154 and increment counter 164 to 1. Responding device 116 can send a NACK with the identifier of group 154 to requesting device 112 (operation 310). Similarly, requesting device 114 can send a request (operation 312). Responding device 116 can allocate the request to group 154 and increment counter 164 to 2. Responding device 116 can then send a NACK with the identifier of group 154 to requesting device 114 (operation 314). Hence, counter 162 of group 152 can have a value of 1, and counter 164 of group 154 can have a value of 2.

Requesting device 112 may resend the request with the identifier of group 152 (operation 316). Responding device 116 can determine that the request belongs to the privileged group. Since privileged segment 126 of tracker 120 can accommodate the request, responding device 116 can accept the request even though threshold 140 has been reached. Responding device 116 can then decrement counter 162 of group 152 to 0. Since counter 162 of group 152 has a value of 0 and counter 164 of group 154 has a value of 2, responding device 116 can select group 154 as the privileged group. Subsequently, requesting device 114 can resend the request with the identifier of group 154 (operation 318). Responding device 116 can determine that the request belongs to the privileged group. Since privileged segment 126 of tracker 120 can accommodate the request, responding device 116 can accept the request. In this way, responding device 116 can ensure that even though requesting device 112 has sent a larger number of requests than requesting device 114, tracker 120 can accommodate requests from requesting device 114 as well.

Suppose that a request from generic segment 128 is completed (operation 320). However, even with the completion, the tracker utilization can remain higher than threshold 140. For example, if tracker 120 is implemented as a linked list, the removal of the completed request from the linked list causes a request from privileged segment 126 to be moved to generic segment 128. Consequently, if requesting device 114 sends a request (operation 322), responding device 116 can allocate the request to group 152 and increment counter 162 to 1. In other words, responding device 116 can determine whether generic segment 128 can accommodate a request based on whether the overall utilization of tracker 120 has reached threshold 140. Accordingly, responding device 116 can send a NACK with the identifier of group 152 to requesting device 114 (operation 324). Hence, counter 162 of group 152 can have a value of 1, and counter 164 of group 154 can have a value of 1.

Requesting device 112 may resend the request with the identifier of group 154 (operation 326). Responding device 116 can determine that the request belongs to the privileged group. Due to the completed request from generic segment 128, privileged segment 126 may accommodate the request. Responding device 116 can then accept the request and decrement counter 164 of group 154 to 0. Since counter 162 of group 152 has a value of 1 and counter 164 of group 154 has a value of 0, responding device 116 can select group 152 as the privileged group. Subsequently, if requesting device 112 sends a request (operation 328), responding device 116 can allocate the request to group 154 and increment counter 164 to 1. Responding device 116 can send a NACK with the identifier of group 154 to requesting device 112 (operation 330). In this way, responding device 116 can facilitate progression of the requests from multiple sources directed to tracker 120.

Figure 4A:
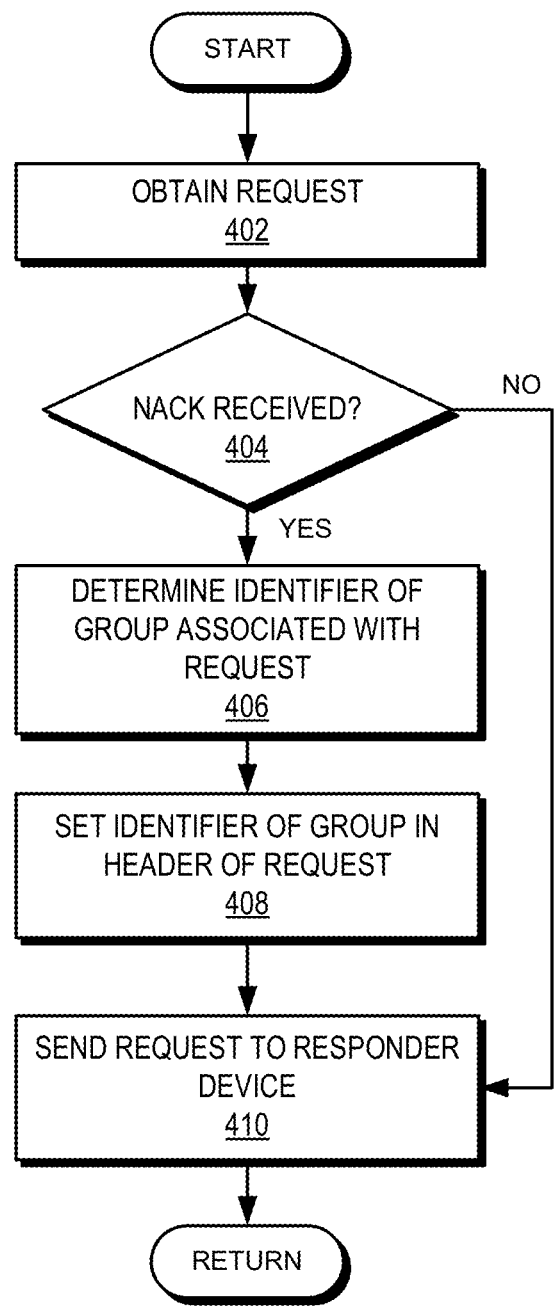
FIG. 4A presents a flowchart illustrating the process of a requesting device issuing a request based on a progression group, in accordance with an aspect of the present application.

FIG. 4A presents a flowchart illustrating the process of a requesting device issuing a request based on a progression group, in accordance with an aspect of the present application. During operation, the requesting device can obtain a request (e.g., from an egress tracker) (operation 402). The request can be issued by an application and placed on the tracker. The requesting device can determine whether a NACK is received for the request (operation 404). If a NACK is received, the request can be a reissued request. The requesting device can then determine the identifier of the group associated with the request (operation 406) and set the identifier of the group in the header of the request (operation 408). Upon setting the identifier in the header of the request (operation 408) or the NACK is not received (operation 404), the requesting device can send the request to the responder device (operation 410). The requesting device can send the request via a packet.

Figure 4B:
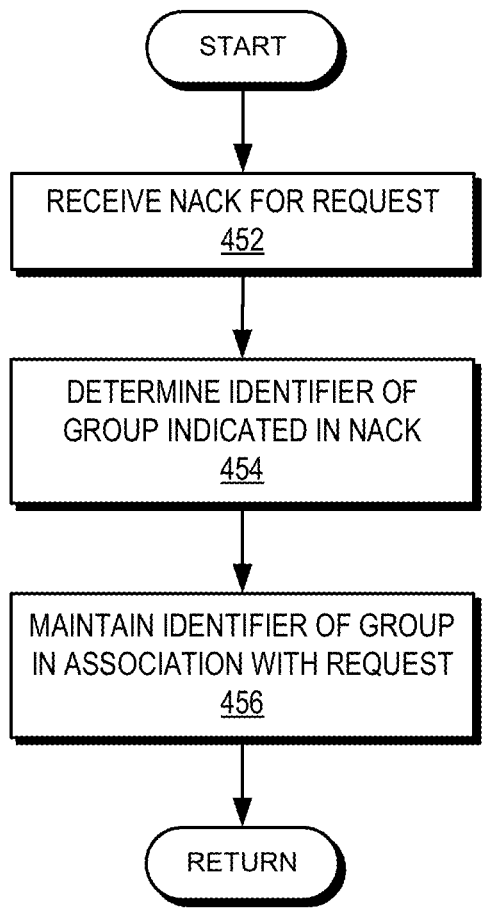
FIG. 4B presents a flowchart illustrating the process of a requesting device associating a progression group indicated in a negative acknowledgment (NACK) with a corresponding request, in accordance with an aspect of the present application.

FIG. 4B presents a flowchart illustrating the process of a requesting device associating a progression group indicated in a NACK with a corresponding request, in accordance with an aspect of the present application. During operation, the requesting device can receive a NACK for a request (operation 452). The requesting device can then determine the identifier of the group indicated in the NACK (operation 454) and maintain the identifier of the group in association with the request (operation 456). The requesting device may store the identifier of the group in the egress queue with the request.

Figure 5A:
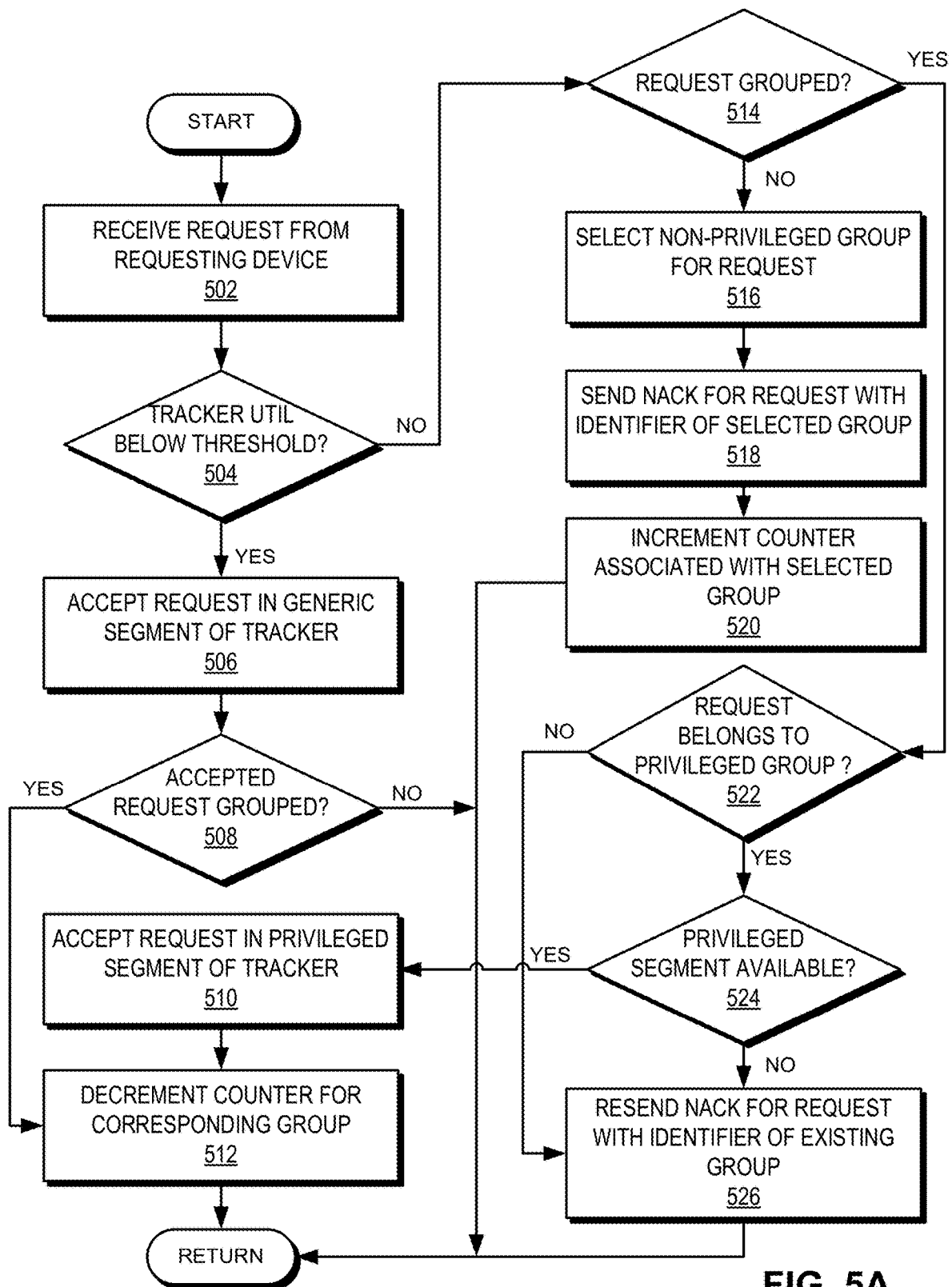
FIG. 5A presents a flowchart illustrating the process of a responding device processing a request based on a set of progression groups, in accordance with an aspect of the present application.

FIG. 5A presents a flowchart illustrating the process of a responding device processing a request based on a set of progression bins, in accordance with an aspect of the present application. During operation, the responder device can receive a request from the requesting device (operation 502) and determine whether the utilization of the tracker is below the threshold (operation 504). If the tracker utilization is below the threshold, the generic segment of the tracker can accommodate the request regardless of the state of the request. The responding device can then accept the request in the generic segment of the tracker (operation 506) and determine whether the accepted request is grouped (operation 508).

If the accepted request is grouped, the responding device can decrement the counter for the corresponding group (operation 512). If the tracker utilization is not below the threshold, the generic segment of the tracker cannot accommodate the request. The responding device can then determine whether the request is grouped (operation 514). If the request is not grouped, the responding device can select a non-privileged group for the request (operation 516). The responding device can then send a NACK for the request with the identifier of the selected group (operation 518) and increment the counter associated with the selected group (operation 520). If the request is grouped, the responding device can determine whether the request belongs to the privileged group (operation 522).

If the request does not belong to the privileged group, the responding device can determine whether the privileged segment is available for the request (operation 524). If the request does not belong to the privileged group (operation 522) or the privileged segment is not available (operation 524), the responding device can resend a NACK for the request with the identifier of the existing group (operation 526). On the other hand, if the privileged segment is available (operation 524), the responding device can accept the request in the privileged segment of the tracker (operation 510) and decrement the counter for the corresponding group (operation 512).

Figure 5B:
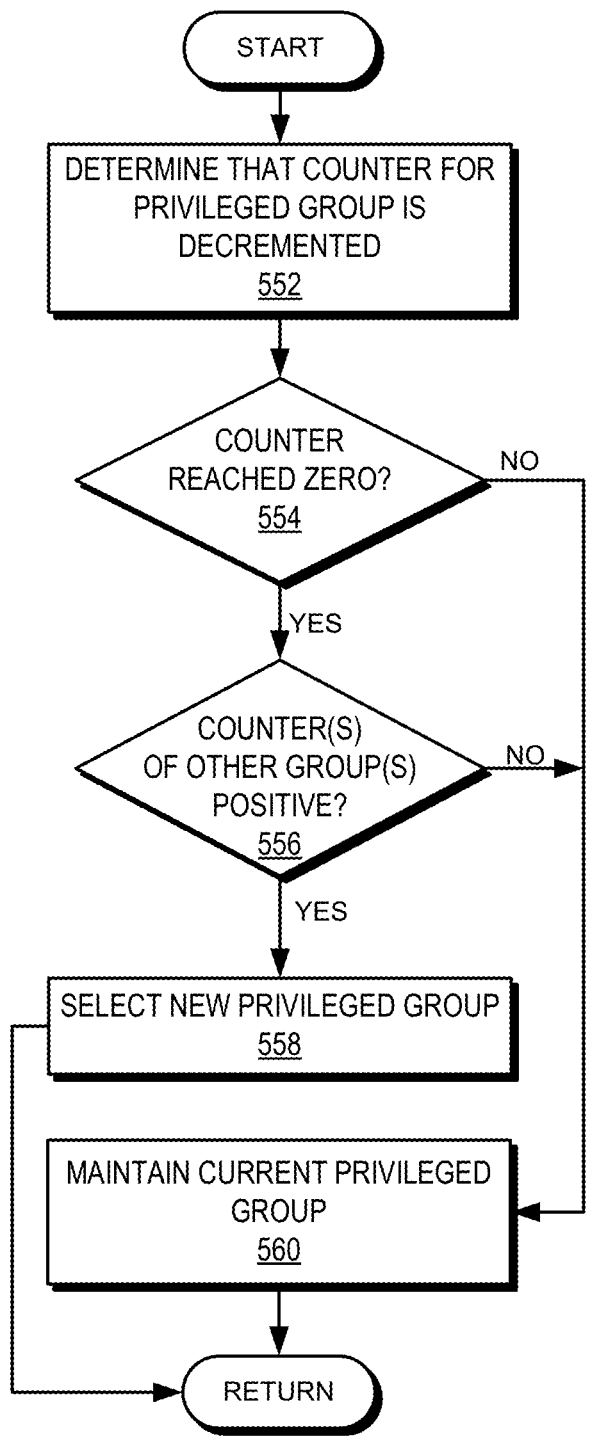
FIG. 5B presents a flowchart illustrating the process of a responding device selecting a privileged group from a set of progression groups, in accordance with an aspect of the present application.

FIG. 5B presents a flowchart illustrating the process of a responding device selecting a privileged group from a set of progression bins, in accordance with an aspect of the present application. The responding device can determine that the counter for the privileged group is decremented (operation 552) and determine whether the counter has reached zero (operation 554). If the counter has reached zero, the responding device can determine whether the counter(s) of the other group(s) are positive (operation 556). If the counter(s) of the other group(s) are positive, the responding device can select a new privileged group (operation 558). On the other hand, if the counter has not reached zero (operation 554) or the counter(s) of the other group(s) are not positive (operation 556), the responding device can maintain the current privileged group (operation 560).

Figure 6:
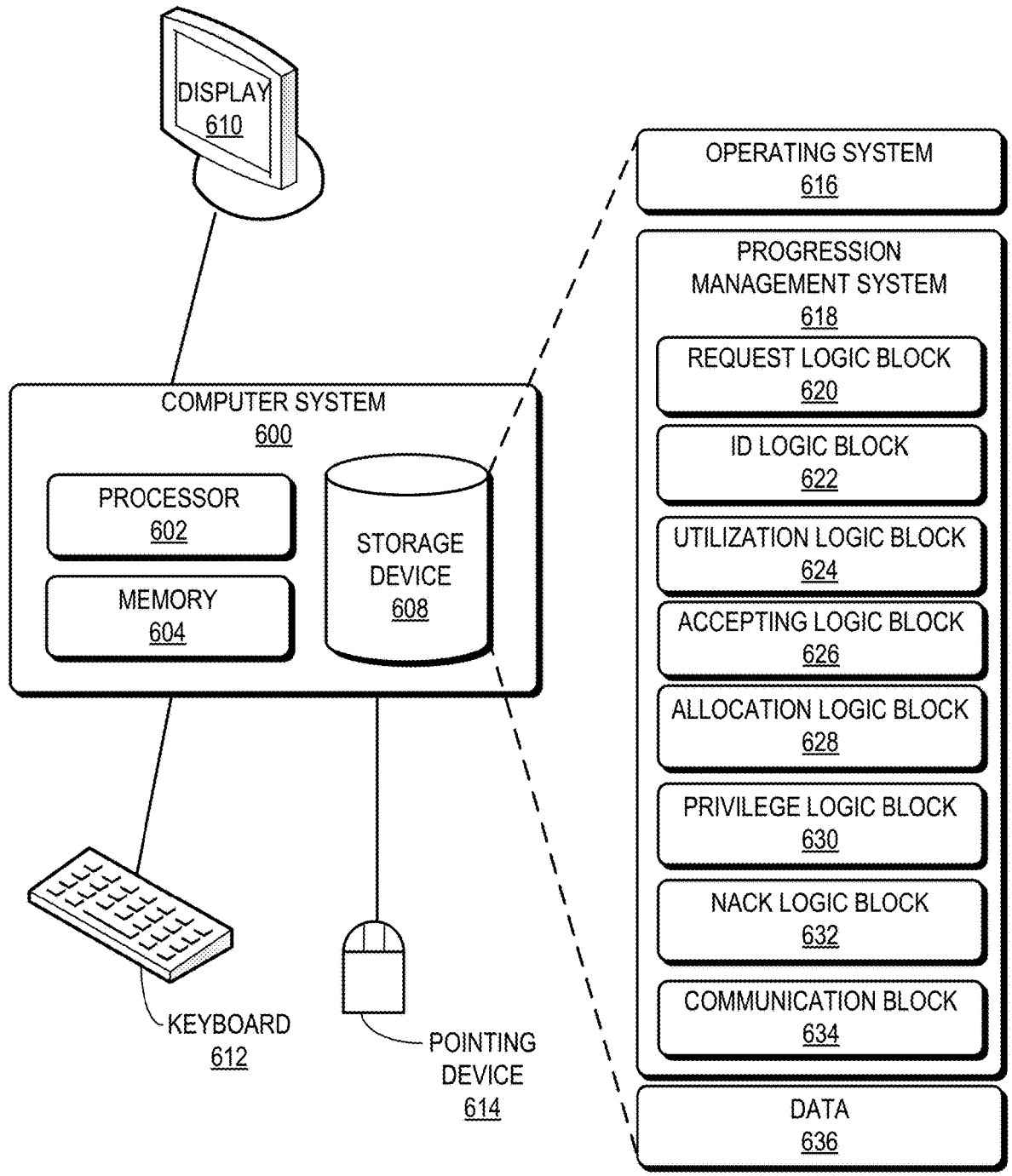
FIG. 6 illustrates an exemplary computer system that facilitates efficient progression management for multi-source trackers, in accordance with an aspect of the present application.

FIG. 6 illustrates an exemplary computer system that facilitates efficient progression management for multi-source trackers, in accordance with an aspect of the present application. Computer and communication system 600 includes a processor 602, a memory device 604, and a storage device 608. Memory device 604 can include a volatile memory device (e.g., a dual in-line memory module (DIMM)). Furthermore, computer and communication system 600 can be coupled to a display device 610, a keyboard 612, and a pointing device 614. Storage device 608 can store an operating system 616, a progression management system 618, and data 636. Progression management system 618 can facilitate the operations of requesting devices 112 and 114, and responding device 116.

Progression management system 618 can include instructions, which when executed by computer and communication system 600 can cause computer and communication system 600 to perform methods and/or processes described in this disclosure. Specifically, if system 600 operates as a requesting device, progression management system 618 can include instructions for issuing a request from an egress tracker (request logic block 620). Progression management system 618 can include instructions for obtaining an identifier of a group from a NACK for a request and storing the identifier in association with the request (identifier logic block 622). Furthermore, progression management system 618 can include instructions for reissuing the request with the identifier of the group (request logic block 620).

On the other hand, if system 600 operates as a responding device, progression management system 618 can include instructions for determining the utilization of an ingress tracker and determining whether the utilization has reached a threshold (utilization logic block 624). In addition, progression management system 618 can also include instructions for maintaining the threshold (utilization logic block 626). Progression management system 618 can also include instructions for determining whether to accept a request (e.g., a new or a retransmitted request) to the tracker based on the utilization (accepting logic block 626). Furthermore, progression management system 618 can include instructions for determining a progression group for an unaccepted request (allocation logic block 628). Progression management system 618 can also include instructions for maintaining and updating a counter for a respective progression group (allocation logic block 628).

Moreover, progression management system 618 can include instructions for selecting a privileged group (privilege logic block 630). Furthermore, progression management system 618 can include instructions for selecting a new privileged group based on a swapping criterion (privilege logic block 630). Progression management system 618 can also include instructions for sending a NACK with the identifier of a corresponding group for an unaccepted request (NACK logic block 632). Progression management system 618 may further include instructions for sending and receiving messages, such as requests and NACKs (communication logic block 634). Data 636 can include any data that can facilitate the operations of progression management system 618. Data 636 can include, but are not limited to, group allocation information, the counter corresponding to a respective group, and threshold information.

Figure 7:
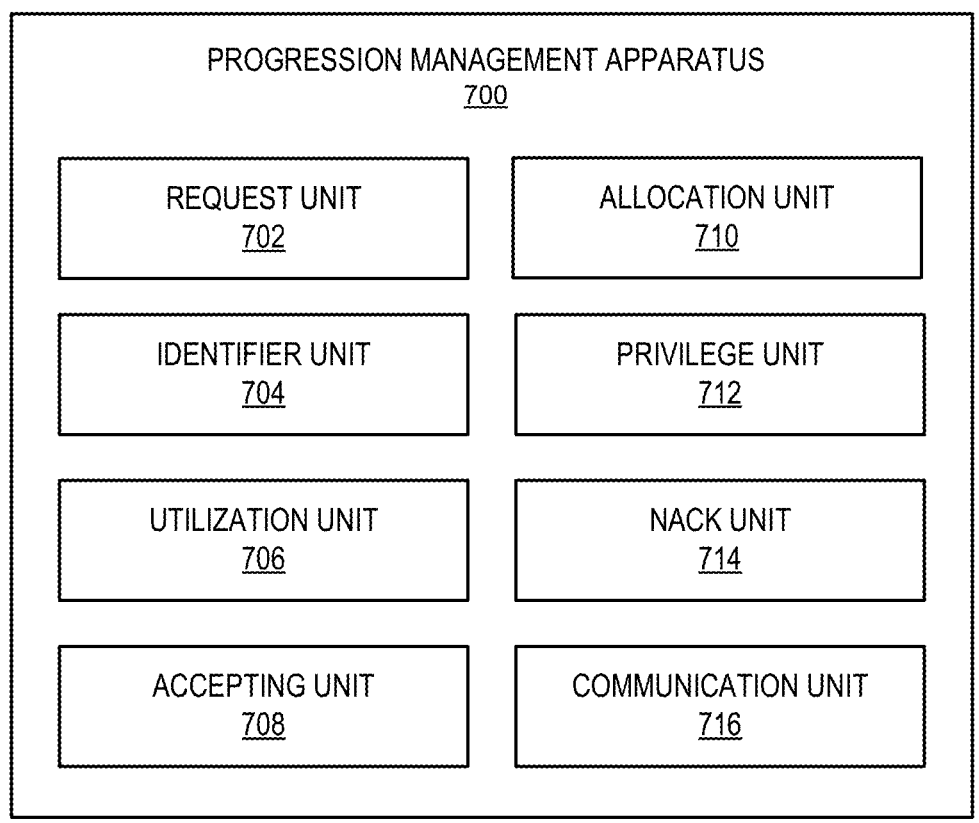
FIG. 7 illustrates an exemplary apparatus that facilitates efficient progression management for multi-source trackers, in accordance with an aspect of the present application.

FIG. 7 illustrates an exemplary apparatus that facilitates efficient progression management for multi-source trackers, in accordance with an aspect of the present application. Progression management apparatus 700 can comprise a plurality of units or apparatuses which may communicate with one another via a wired, wireless, quantum light, or electrical communication channel. Apparatus 700 can be a device in a network. Apparatus 700 may be realized using one or more integrated circuits, and may include fewer or more units or apparatuses than those shown in FIG. 7. Further, apparatus 700 may be integrated into a computer system, or realized as a separate device that is capable of communicating with other computer systems and/or devices. Specifically, apparatus 700 can comprise units 702-716, which perform functions or operations similar to modules 620-634 of computer and communication system 600 of FIG. 6, including: a request unit 702; an identifier unit 704; a utilization unit 706; an accepting unit 708; a group unit 710; a privilege unit 712; a NACK unit 714; and a communication unit 716.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating sender-side congestion control, the method comprising:
   maintaining, in a memory device of a responder device, a first tracker for all requests and a second tracker for a privileged group of requests, wherein a tracker is a buffer capable of tracking in-progress requests accepted by the tracker;
   selecting, by the responder device, a first group from a set of groups as the privileged group;
   receiving, by the responder device, a request from a requesting device;
   determining that a request from a requesting device cannot be accepted into the first tracker;
   determining whether the request belongs to the first group based on a header field of the request;
   in response to the request belonging to the first group, selecting the request for accepting into the second tracker and performing a set of operations indicated in the request;
   determining that a respective request belonging to the first group has been accepted; and
   selecting a second group from the set of groups as the privileged group.

2. The method of claim 1, wherein the first and second trackers are segments of an ingress tracker at the responding device.

3. The method of claim 2, further comprising:
   maintaining a threshold for the ingress tracker, wherein the second tracker is a segment of the ingress tracker beyond the threshold; and
   determining whether utilization of the ingress tracker has reached the threshold.

4. The method of claim 1, wherein selecting the request for accepting into the second tracker further comprises:
   determining that the second tracker can accept the request; and
   accepting the request into the second tracker.

5. The method of claim 1, further comprising:
   determining whether the first tracker can accept a second request from the requesting device, wherein the second request is not associated with the set of groups; and
   allocating a non-privileged group from the set of groups to the second request.

6. The method of claim 5, further comprising sending a negative acknowledgment (NACK) comprising an identifier of the allocated non-privileged group to the requesting device.

7. The method of claim 1, further comprising maintaining a corresponding counter for a respective group of the set of groups, wherein the counter indicates a number of requests allocated to the group.

8. The method of claim 7, further comprising:
   incrementing the counter in response to allocating a request to the group; and
   decrementing the counter in response to accepting a request belonging to the group.

9. The method of claim 1, further comprising, in response to determining that a third request from the requesting device can be accepted in the first tracker, accepting the third request regardless of the third request's association with the set of groups.

10. An apparatus, comprising:
    processing circuitry;
    a memory device to maintain a first tracker for all requests and a second tracker for a privileged group of requests, wherein a tracker is a buffer capable of tracking in-progress requests accepted by the tracker;
    a privilege logic block to select a first group from a set of groups as the privileged group;
    a communication logic block to receive a request from a requesting device;
    an acceptance logic block to:
      determine that a request from a remote apparatus cannot be accepted into the first tracker;
      determine whether the request belongs to the first group based on a header field of the request; and
      in response to the request belonging to the first group, select the request for accepting into the second tracker and performing a set of operations indicated in the request; and
    wherein the privilege logic block is further to:
      determine that a respective request belonging to the first group has been accepted; and
      select a second group from the set of groups as the privileged group.

11. The apparatus of claim 10, wherein the first and second trackers are segments of an ingress tracker in the memory device.

12. The apparatus of claim 11, further comprising a utilization logic block to:
    maintain a threshold for the ingress tracker, wherein the second tracker is a segment of the ingress tracker beyond the threshold; and
    determine whether utilization of the ingress tracker has reached the threshold.

13. The apparatus of claim 10, wherein the acceptance logic block is to select the request for accepting into the second tracker by:
    determining that the second tracker can accept the request; and
    accepting the request into the second tracker.

14. The apparatus of claim 10, wherein the acceptance logic block is further to determine whether the first tracker can accept a second request from the remote apparatus, wherein the second request is not associated with the set of groups; and
    wherein the apparatus further comprises an allocation logic block to allocate a non-privileged group from the set of groups to the second request.

15. The apparatus of claim 14, further comprising a negative acknowledgment (NACK) logic block to send a NACK comprising an identifier of the allocated non-privileged group to the remote apparatus.

16. The apparatus of claim 10, wherein the allocation logic block is further to maintain a corresponding counter for a respective group of the set of groups, wherein the counter indicates a number of requests allocated to the group.

17. The apparatus of claim 16, wherein the allocation logic block is further to:
    increment the counter in response to allocating a request to the group; and
    decrement the counter in response to accepting a request belonging to the group.

18. The apparatus of claim 10, wherein the acceptance logic block is further to, in response to determining that a third request from the remote apparatus can be accepted in the first tracker, accept the third request regardless of the third request's association with the set of groups.

19. A computer system, comprising:
a processor;
a storage device;
a non-transitory computer-readable storage medium storing instructions, which when executed by the processor causes the processor to perform a method, the method comprising:
 maintaining, in the storage device, a first tracker for all requests and a second tracker for a privileged group of requests, wherein a tracker is a buffer capable of tracking in-progress requests accepted by the tracker;
 selecting a first group from a set of groups as the privileged group;
 receiving a request from a requesting device;
 determining that a request from a requesting device cannot be accepted into the first tracker;
 determining whether the request belongs to the first group based on a header field of the request;
 in response to the request belonging to the first group, selecting the request for accepting into the second tracker and performing a set of operations indicated in the request;
 determining that a respective request belonging to the first group has been accepted; and
 selecting a second group from the set of groups as the privileged group.

20. The computer system of 19, wherein the method further comprises:
 determining whether the first tracker can accept a second request from the requesting device, wherein the second request is not associated with the set of groups; and
 allocating a non-privileged group from the set of groups to the second request.

* * * * *